(12) United States Patent
Huang et al.

(10) Patent No.: US 11,761,445 B2
(45) Date of Patent: Sep. 19, 2023

(54) AIR CONDITIONER HAVING COMPRESSOR INCLUDING CURVED SUCTION PORT AND A PLURALITY OF EXHAUST PORTS

(71) Applicant: Green Refrigeration Equipment Engineering Research Center of Zhuhai Gree Co., Ltd., Zhuhai (CN)

(72) Inventors: Hui Huang, Zhuhai (CN); Yusheng Hu, Zhuhai (CN); Pengkai Wan, Zhuhai (CN); Jia Xu, Zhuhai (CN); Liping Ren, Zhuhai (CN); Fayou Luo, Zhuhai (CN); Fei Wu, Zhuhai (CN)

(73) Assignee: Green Refrigeration Equipment Engineering Research Center of Zhuhai Gree Co., Ltd., Guangdong (CN)

( * ) Notice: Subject to any disclaimer, the term of this patent is extended or adjusted under 35 U.S.C. 154(b) by 538 days.

(21) Appl. No.: 16/619,593

(22) PCT Filed: Dec. 25, 2017

(86) PCT No.: PCT/CN2017/118286
§ 371 (c)(1),
(2) Date: Dec. 5, 2019

(87) PCT Pub. No.: WO2019/061893
PCT Pub. Date: Apr. 4, 2019

(65) Prior Publication Data
US 2020/0132073 A1 Apr. 30, 2020

(30) Foreign Application Priority Data
Sep. 29, 2017 (CN) .......................... 201710916718.9

(51) Int. Cl.
*F04C 29/12* (2006.01)
*F24F 11/47* (2018.01)
(Continued)

(52) U.S. Cl.
CPC ............ *F04C 29/12* (2013.01); *F04C 27/007* (2013.01); *F16C 23/06* (2013.01); *F24F 11/46* (2018.01);
(Continued)

(58) Field of Classification Search
CPC ...... F04C 29/12; F04C 27/007; F04C 29/128; F04C 2210/1005; F04C 2240/50;
(Continued)

(56) References Cited

U.S. PATENT DOCUMENTS

2015/0110661 A1* 4/2015 Tanaka ................ F04C 29/0078
418/259

FOREIGN PATENT DOCUMENTS

| CN | 105275815 A | 1/2016 |
|---|---|---|
| CN | 105952644 A | 9/2016 |

(Continued)

OTHER PUBLICATIONS

English Machine Translation of CN206035814U; translated by Espacenet on Feb. 9, 2022 (Year: 2017).*

(Continued)

*Primary Examiner* — Dominick L Plakkoottam
*Assistant Examiner* — Paul W Thiede
(74) *Attorney, Agent, or Firm* — The Webb Law Firm

(57) ABSTRACT

The present disclosure provides a compressor and an air conditioner having the same. The compressor includes: a main shaft with a convex portion and a slip sheet; a cylinder; and an air inlet and outlet device including a disk body and an air suction port including an outer side, an inner side and a connecting side located between the outer side and the inner side, wherein the outer side is overlapped with an inner wall of the cylinder or is located on the inner side of the inner wall of the cylinder, the inner side is overlapped with an outer wall of the convex portion or is located on the outer (Continued)

side of the convex portion, and the connecting side is overlapped with a side wall of the slip sheet or is located on the inner side of the side wall of the slip sheet.

8 Claims, 15 Drawing Sheets

(51) Int. Cl.
  F04C 27/00    (2006.01)
  F16C 23/06    (2006.01)
  F24F 1/08     (2011.01)
  F24F 11/46    (2018.01)
(52) U.S. Cl.
  CPC .... *F04C 29/128* (2013.01); *F04C 2210/1005* (2013.01); *F04C 2240/50* (2013.01); *F04C 2240/60* (2013.01); *F04C 2240/601* (2013.01); *F04C 2240/801* (2013.01); *F04C 2250/101* (2013.01); *F16C 2362/52* (2013.01); *F24F 1/08* (2013.01)
(58) Field of Classification Search
  CPC ............ F04C 2240/60; F04C 2240/601; F04C 2240/801; F04C 2250/101; F16C 23/06; F16C 2362/52; F24F 11/46; F24F 1/08
  See application file for complete search history.

(56) References Cited

FOREIGN PATENT DOCUMENTS

| CN | 205677829 U | 11/2016 |
| CN | 206035814 U | 3/2017 |
| CN | 207349077 U | 5/2018 |
| DE | 3801306 A1 * | 8/1988 |
| JP | 2005002947 A | 1/2005 |
| JP | 2016048057 A | 4/2016 |

OTHER PUBLICATIONS

English Machine Translation of JP2005002947A (translated by Espacenet on Apr. 23, 2022 (Year: 2005).*
Basic Knowledge of Construction Machinery, China Communications Press, 1980, pp. 18-19, (partial translation included).

* cited by examiner

AIR CONDITIONER HAVING COMPRESSOR INCLUDING CURVED SUCTION PORT AND A PLURALITY OF EXHAUST PORTS

CROSS-REFERENCE TO RELATED APPLICATIONS

This application is the United States national phase of International Application No. PCT/CN2017/118286 filed Dec. 25, 2017, and claims priority to Chinese Patent Application No. 201710916718.9 filed Sep. 29, 2017, the disclosures of which are hereby incorporated by reference in their entirety.

BACKGROUND OF THE INVENTION

Field of the Invention

The present disclosure relates to the field of air conditioning, and in particular to a compressor and an air conditioner having the same.

Description of Related Art

FIG. 1 shows a top view of a cylinder of a compressor of the related technologies, and FIG. 2 shows a shape schematic diagram of an air suction port in FIG. 1. The cylinder of the compressor shown in FIG. 1 includes a bearing outer ring and a bearing inner ring disposed in the bearing outer ring. The bearing inner ring can convert the relative sliding of a slip sheet head and an inner wall of the inner ring into the rolling motion of the inner ring, thereby reducing the mechanical power consumption of the compressor and improving the energy efficiency of the compressor. In the manner of the present embodiment, when the air suction port cooperates with the cylinder, the position of the air suction port is shown by a shaded portion in FIG. 1, and the air suction port is crescent-shaped.

The compressor is prone to serious inclination of a main shaft and the bearing inner ring during the operation.

SUMMARY OF THE INVENTION

The present invention provides a compressor and an air conditioner having the same, in order to solve the problem that a main shaft inclines more seriously.

According to one aspect of the present invention, a compressor is provided, including: a main shaft provided with a convex portion and a slip sheet installed on the convex portion; a cylinder, wherein the convex portion and the slip sheet are penetrated in an inner cavity of the cylinder; and an air inlet and outlet device sleeved on the main shaft and located at least one position above or below the cylinder, and the air inlet and outlet device includes a disk body, an air suction port communicating with the inner cavity is formed on an end of the disk body facing to the cylinder, the air suction port includes an outer side, an inner side and a connecting side located between the outer side and the inner side, wherein the outer side is overlapped with an inner wall of the cylinder or is located on an inner side of the inner wall of the cylinder, the inner side is overlapped with an outer wall of the convex portion or is located on an outer side of the convex portion, and when the basic-volume of the cylinder is the maximum, the connecting side is overlapped with a side wall of the slip sheet closest to the air suction port and facing to the rotating direction of the main shaft or is located on an inner side of the side wall of the slip sheet.

In some embodiments, the compressor further includes an upper flange and a lower flange, the cylinder is located between the upper flange and the lower flange, and at least one of the upper flange and the lower flange forms the air inlet and outlet device.

In some embodiments, the compressor further includes an upper flange, a lower flange and a partition plate located between the upper flange and the lower flange, and the cylinder is located between the upper flange and the lower flange; the partition plate forms the air inlet and outlet device.

In some embodiments, the partition plate is located between the upper flange and the cylinder or between the lower flange and the cylinder, an overflow channel communicating the air suction port with the outside is arranged on the upper flange or the lower flange, the overflow channel includes an overflow port formed on an end of the upper flange or the lower flange facing to the partition plate, and the air suction port is located within the range of the overflow port.

In some embodiments, a plurality of cylinders are provided, and the partition plate is arranged between two adjacent cylinders.

In some embodiments, a radial air suction port communicating with the air suction port is further formed in the disk body.

In some embodiments, the connecting side is connected between a first end of the outer side and a first end of the inner side, and the air suction port further includes a transition side connected between a second end of the outer side and a second end of the inner side.

In some embodiments, the cylinder includes a bearing outer ring and a bearing inner ring arranged in the bearing outer ring, the outer side is overlapped with the inner wall of the bearing inner ring or is located on the inner side of the inner wall of the bearing inner ring.

In some embodiments, the cylinder further includes a holder and a rolling body which are arranged between the bearing outer ring and the bearing inner ring.

In some embodiments, an exhaust port communicating with the inner cavity is further formed on the end of the disk body facing to the cylinder, and the exhaust port is configured to be completely covered by the slip sheet.

In some embodiments, the width L1 of the exhaust port and the thickness L2 of the slip sheet satisfies the following relationship: $L1 \leq L2$.

In some embodiments, a plurality of exhaust ports are arranged at intervals.

According to another aspect of the present invention, an air conditioner is provided, including a compressor, wherein the compressor is the above-described compressor.

By applying the technical solution of the present invention, the outer side of the air suction port does not exceed the inner wall of the cylinder, the inner side does not exceed the outer wall of the convex portion, and when the basic-volume of the cylinder is the maximum, the connecting side does not exceed the side wall of the slip sheet closest to the air suction port. Therefore, whether the upper flange separately inhales, the lower flange separately inhales, or the upper and lower flanges simultaneously inhale, the convex portion is hardly subjected to the impact force of the suction airflow. Only when the airflow enters a compression chamber along the wall surface, a frictional force is formed on the wall surface, and the frictional force is much smaller than the impact force of the air suction port in the related technology known to the inventor, so that the inclination of the main shaft can be effectively reduced. For the structure using the bearing outer ring and the bearing inner ring, the bearing inner ring is hardly subjected to the impact force of the suction airflow, and only the frictional force exists, thereby effectively reducing the inclination of the bearing inner ring. In addition, for greater displacement compressors, since the upper and lower flanges simultaneously inhale, the area of the air suction port can be increased, the suction speed is decelerated, and the air suction loss is reduced.

BRIEF DESCRIPTION OF THE DRAWINGS

The drawings constituting a part of the present invention are used for providing a further understanding of the present invention, and exemplary embodiments of the present invention and illustrations thereof are used for illustrating the present invention, rather than constituting improper limitations to the present invention. In the drawings.

Figure 1:
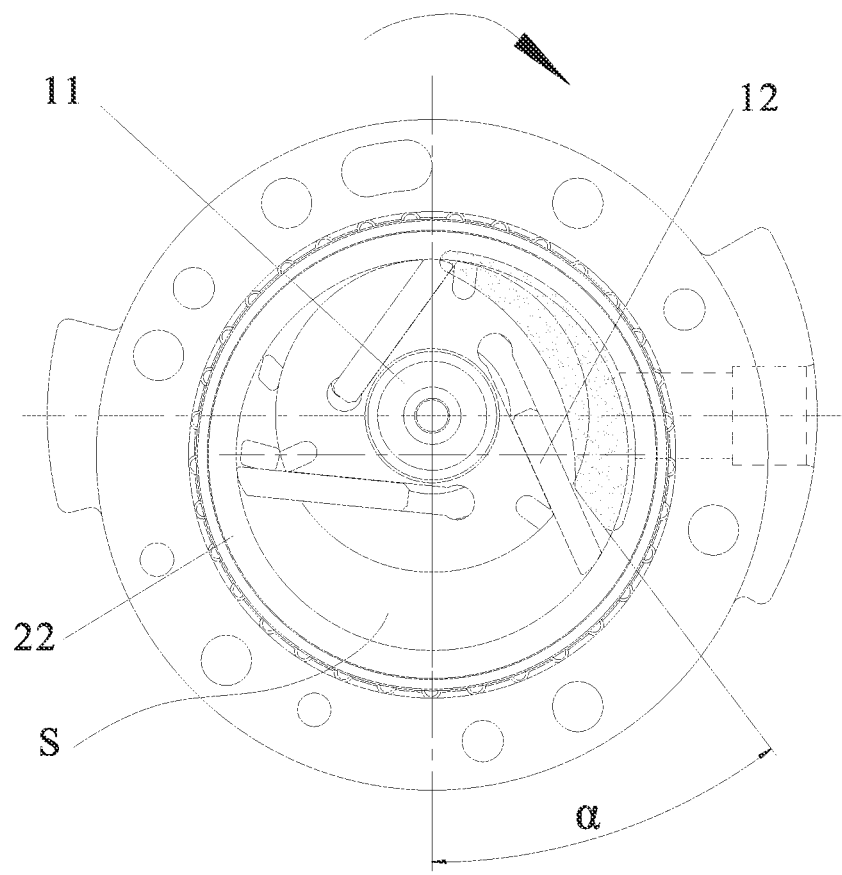
FIG. 1 shows a top view of a cylinder of a compressor in the related technology.

The above drawings include the following reference signs:

10, main shaft; 11, convex portion; 12, slip sheet; 20, cylinder; 21, bearing outer ring; 211, bearing outer ring circulation hole; 22, bearing inner ring; 23, holder; 24, rolling body; 31, air suction port; 311, outer side; 312, inner side; 313, connecting side; 314, transition side; 32, radial air suction port; 33, exhaust port; 40, upper flange; 41, overflow port; 42, circulation hole of the upper flange; 50, lower flange; 51, circulation hole of the lower flange; 60, lower cover plate; 70, partition plate.

DESCRIPTION OF THE INVENTION

A clear and complete description of technical solutions in the embodiments of the present invention will be given below, in combination with the drawings in the embodiments of the present invention. Apparently, the embodiments described below are merely a part, but not all, of the embodiments of the present invention. The following description of at least one exemplary embodiment is merely illustrative and is in no way used as any limitation to the present invention and its application or use. All of other embodiments, obtained by those of ordinary skill in the art based on the embodiments of the present invention without any creative effort, fall into the protection scope of the present invention.

It should be noted that the terms used herein are for the purpose of describing specific embodiments, and are not intended to limit the exemplary embodiments according to the present invention. As used herein, a singular form is also intended to include a plural form; in addition, it should also be understood that, when the terms "comprises" and/or "includes" are used in the specification, they indicate the presence of features, steps, operations, devices, components, and/or combinations thereof.

Unless otherwise specified, relative arrangements, numerical expressions and numerical values of components and steps set forth in these embodiments are not intended to limit the scope of the present invention. In the meantime, it should be understood that the dimensions of various parts shown in the drawings are not drawn according to the actual scale relationship for the convenience of the description. Techniques, methods and devices known to those of ordinary skill in the relevant art may be not discussed in detail, but where appropriate, the techniques, methods and devices should be considered as a part of the authorized specification. In all examples shown and discussed herein, any specific value should be construed as illustrative only and not as a limitation. Accordingly, other examples of the exemplary embodiments may have different values. It should be noted that similar reference signs and letters indicate similar items in the following drawings, and therefore, once a certain item is defined in a drawing, it does not need to be in some embodiments discussed in the subsequent drawings.

In view of the problem of serious inclination of a main shaft and a bearing inner ring proposed in the background art, the inventors have found the causes of the above problem after carrying out a series of experiments, and proposed a corresponding solution for the above causes.

Figure 2:
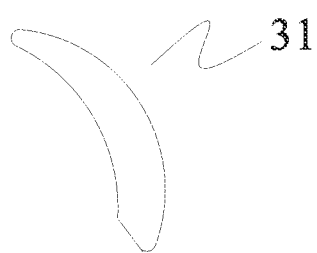
FIG. 2 shows a shape schematic diagram of an air suction port in FIG. 1.

The inventors have found through experiments that the area of a crescent air suction port 31 shown in FIG. 2 is much greater than an actually effective area of the air suction port, an outer side of the air suction port 31 is greater than the inner diameter of the bearing inner ring, and an inner side protrudes from an outer wall of a convex portion, so that more portions of the convex portion 11 and the bearing inner ring 22 are suspended, and the convex portion and the bearing inner ring cover part of the air suction port of a flange. During the operation of a compressor, the convex portion 11 and the bearing inner ring 22 are vulnerable to the impact of the suction airflow to incline. In addition, since the above-mentioned convex portion and the bearing inner ring are suspended, the suspended location may lack lubricating oil, and with the operation of the compressor, when the suspended location of the convex portion 11 starts to generation friction with the ends of upper and lower flanges, oil shortage may occur, thus affecting the operation stability of the compressor.

Figure 3A:
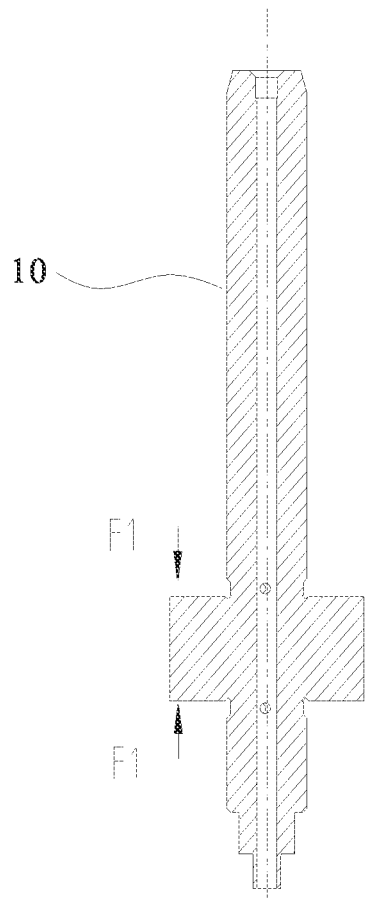
FIG. 3a shows a force schematic diagram of a main shaft of the compressor in FIG. 1.
Figures 3B, 3C:
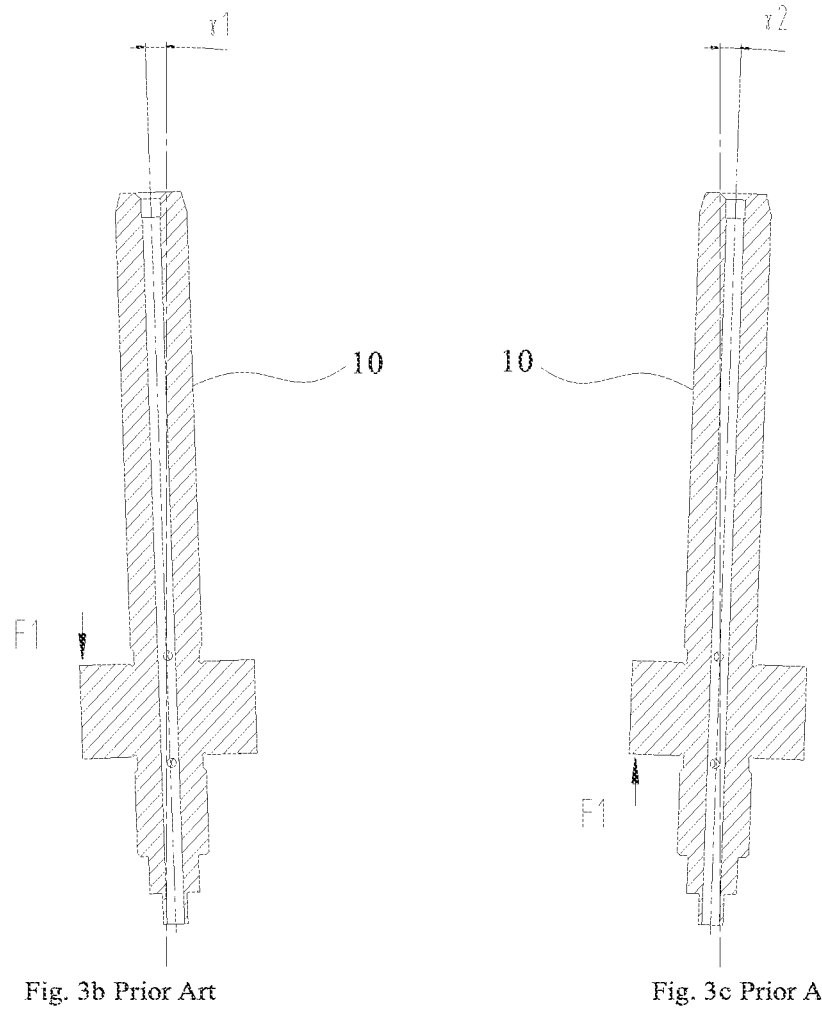
FIG. 3b and FIG. 3c show force schematic diagrams of a main shaft of a compressor in additional two related technologies.
Figure 4A:
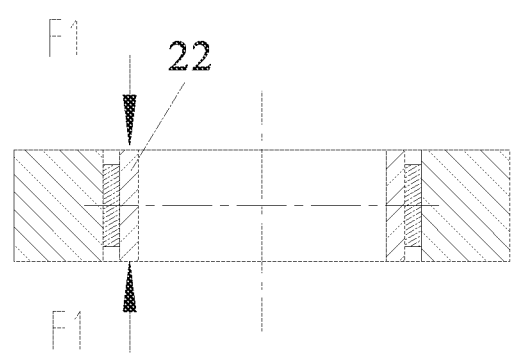
FIG. 4a shows a force schematic diagram of a bearing inner ring of the cylinder of the compressor in FIG. 1.
Figure 4B:
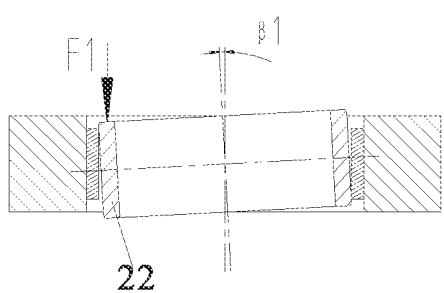
FIG. 4b and FIG. 4c show force schematic diagrams of a bearing inner ring of a compressor in additional two related technologies.
Figure 4C:
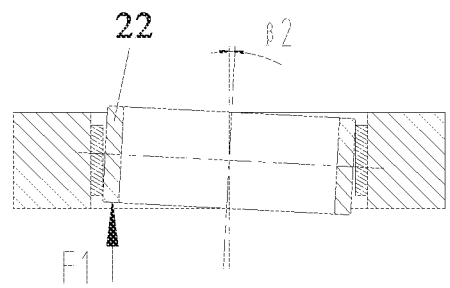

In the embodiments shown in FIG. 3a and FIG. 4a, the embodiments in which the upper and lower flanges simultaneously inhale is adopted, since the airflow at the air suction ports of the upper and lower flanges simultaneously impacts the main shaft and the bearing inner ring, when the impact forces on the main shaft generated by the airflow at the air suction ports of the upper and lower flanges are all F1, the impact forces can offset each other, and when the impact forces on the bearing inner ring generated by the airflow at the air suction ports of the upper and lower flanges are all F1, the impact forces can offset each other. However, the impact forces can offset each other in theory, the product cannot be consistent with the theory in fact, therefore the main shaft and the bearing inner ring will still generate a certain inclination. FIG. 3b and FIG. 4b show force conditions of the main shaft and the bearing inner ring when the upper flange separately inhales, a deflection angle generated by the main shaft in FIG. 3b is γ1, and the deflection angle generated by the bearing inner ring in FIG. 4b is β1. FIG. 3c and FIG. 4c show force conditions of the main shaft and the bearing inner ring when the lower flange separately inhales, the deflection angle generated by the main shaft in FIG. 3c is γ2, and the deflection angle generated by the bearing inner ring in FIG. 4c is β2. It can be seen from FIG. 3b, FIG. 3c, FIG. 4b and FIG. 4c that the deflection of the main shaft and the bearing inner ring in the related technology is more serious.

Figure 9:
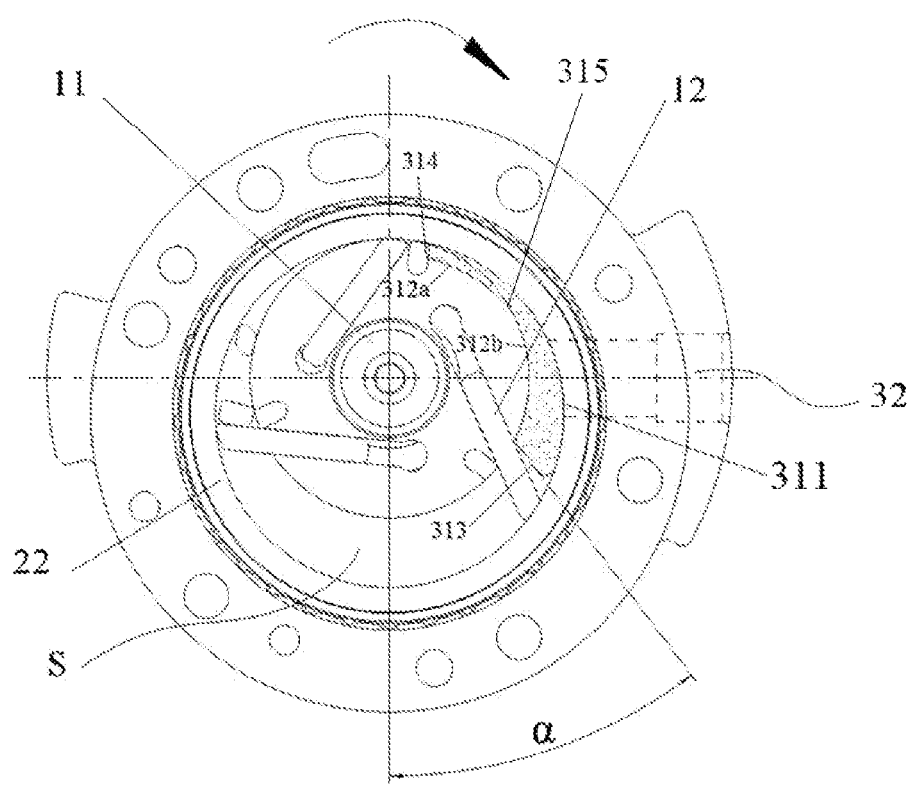
FIG. 9 shows a top view of a cylinder of the pump body in FIG. 5.

It should be additionally noted that: in FIG. 1, when the left side of a slip sheet just reaches an indication line on the right side of an angle α, the basic-volume S is the maximum, the inhalation is finished, and the slip sheet covers a part of the air suction port structure at this time. In order to conveniently check and understand the position of the air suction port, in this figure, the position of the slip sheet is not at the location with the maximum basic-volume, but at a certain angle passing by the location with the maximum elementary volume. Similarly, in the following FIG. 9 and FIG. 17, in order to conveniently check and understand the position of the air suction port, the slip sheet passes by the location with the maximum elementary volume for a certain angle.

The above problems can be effectively solved by the technical solution of the present invention.

As shown in FIG. 5 to FIG. 10, a compressor of a first embodiment includes a main shaft 10, a cylinder 20, an upper flange 40, and a lower flange 50. The cylinder 20 is located between the upper flange 40 and the lower flange 50, a convex portion 11 is arranged on the main shaft 10, and a slip sheet 12 is installed on the convex portion 11. The convex portion 11 and the slip sheet 12 are penetrated in an inner cavity of the cylinder 20. The upper flange 40 and the lower flange 50 are sleeved on the main shaft 10. In the first embodiment, the upper and lower flanges simultaneously inhale. Specifically, the upper flange 40 and the lower flange 50 both include a disk body, an air suction port 31 communicating with the inner cavity is formed in an end of the disk body facing to the cylinder 20, the air suction port 31 includes an outer side 311, an inner side 31 and a connecting side 313 located between the outer side 311 and the inner side 312, wherein when the basic-volume of the cylinder 20 is the maximum, the outer side 311 is overlapped with an inner wall of the cylinder 20, the inner side 312 is overlapped with an outer wall of the convex portion 11, and the connecting side 313 is overlapped with a side wall of the slip sheet 12 closest to the air suction port 31 and facing to the rotating direction of the main shaft 10. When the air suction port matches with the cylinder, the position of the air suction port is shown by a shaded portion in FIG. 9.

By applying the technical solution of the present invention, the outer side 311 of the air suction port 31 does not exceed the inner wall of the cylinder 20, the inner side 312 does not exceed the outer wall of the convex portion 11, and when the basic-volume of the cylinder is the maximum, the connecting side 313 does not exceed the side wall of the slip sheet 12 closest to the air suction port 31. Therefore, whether the upper flange 40 separately inhales, the lower flange 50 separately inhales, or the upper and lower flanges simultaneously inhale, the convex portion 11 is hardly subjected to the impact force of the suction airflow. Only when the airflow enters a compression chamber along the wall surface, a frictional force is formed on the wall surface, and the frictional force is much smaller than the impact force of the air suction port in the related technologies, so that the inclination of the main shaft can be effectively reduced. For the structure using the bearing outer ring and the bearing inner ring, the bearing inner ring is hardly subjected to the impact force of the suction airflow, and only the frictional force exists, thereby effectively reducing the inclination of the bearing inner ring. The situation in which the upper flange 40 separately inhales and the lower flange 50 separately inhale will be described below.

Figure 17:
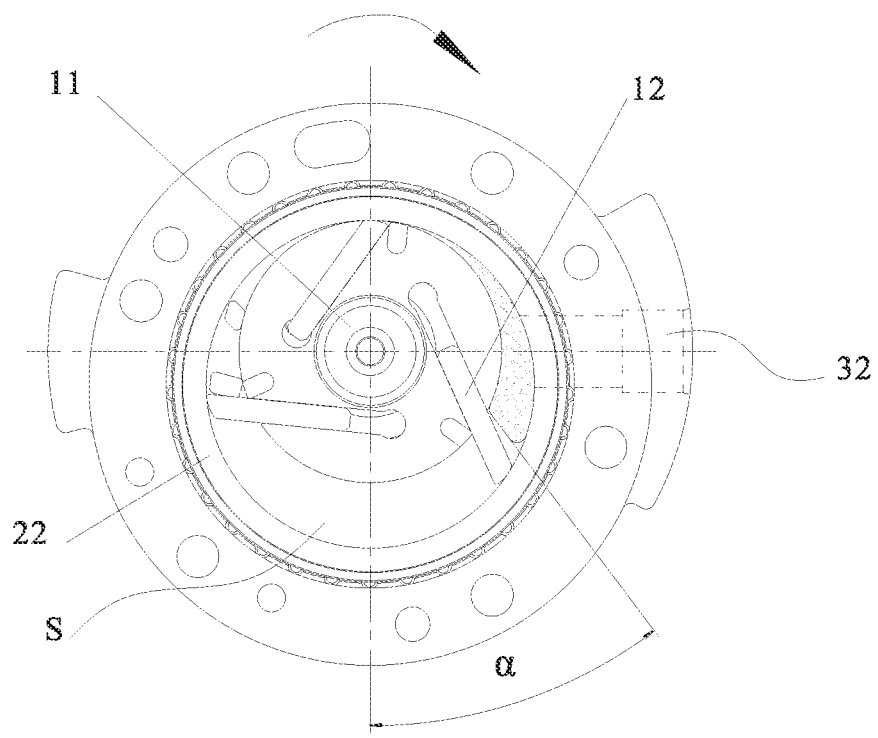
FIG. 17 shows a top view of a cylinder of a fourth embodiment of a compressor according to the present invention.
Figure 23:
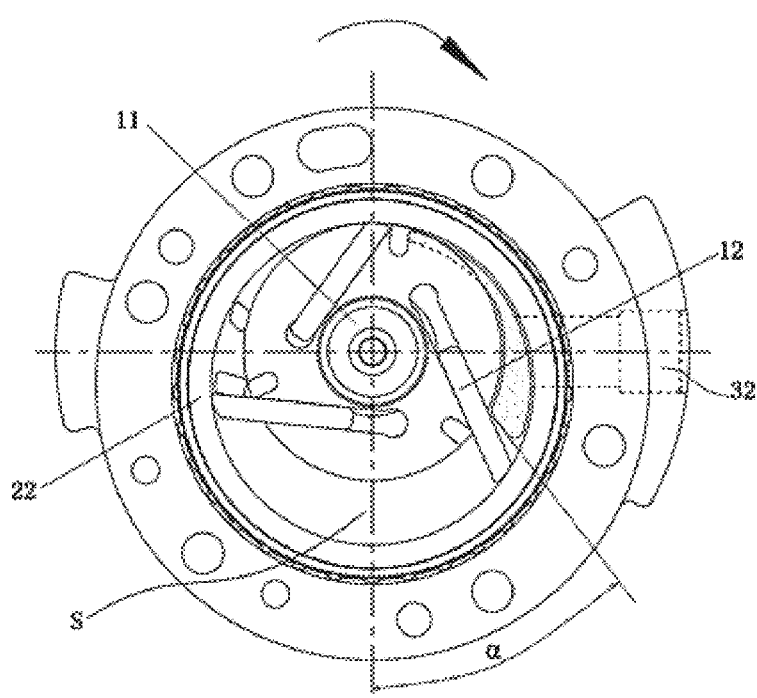
FIG. 23 shows a schematic diagram of a structure according to non-limiting embodiments or aspects of the present disclosure.

It should be noted that, in the embodiments as shown in FIG. 17 and FIG. 23, when the basic-volume of the cylinder 20 is the maximum, the outer side 311 may also be located on the inner side of the inner wall of the cylinder 20, and the inner side 312 may be located on the outer side of the convex portion 11, and the connecting side 313 is located on the inner side of the side wall of the slip sheet 12 closest to the air suction port 31 and facing to the rotating direction of the main shaft. This arrangement also achieves the effect that the convex portion 11 is hardly subjected to the impact force of the suction airflow.

In the first embodiment, a radial air suction port 32 communicating with the air suction port is further formed in the disk body. The radial air suction port 32 introduces air into the air suction port in the radial direction, so that the air suction area can be ensured. Of course, in the embodiments not shown in the figures, channels in other forms may also be disposed to introduce the air to the air suction port.

Figure 10:
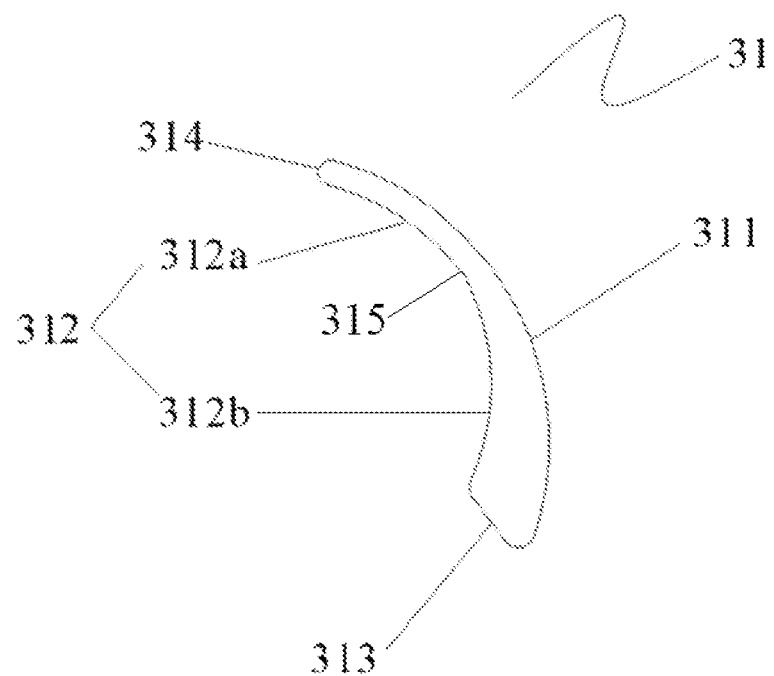
FIG. 10 shows a shape schematic diagram of an air suction port of the pump body in FIG. 5.

As shown in FIG. 10, the connecting side 313 is connected between a first end of the outer side 311 and the first end of the inner side 312, and the air suction port 31 further includes a transition side 314 connected between a second end of the outer side 311 and a second end of the inner side 312. The inner side 312 may be formed with two arc-shaped segments. The two arc-shaped segments include a first arc-shaped segment 312a and a second arc-shaped segment 312b joined at a turning point 315 (as best seen in FIG. 10) in the present embodiment. The first arc-shaped segment 312a is connected with the transition side 314 and the second arc-shaped segment 312b is connected with the connecting side 313. The first arc-shaped segment 312a and the second arc-shaped segment 312b have different arc curvatures that are joined at turning point 315 and the first arc-shaped segment 312a and the outer side 311 form a suction section with a constant width in a circumferential direction of the suction port 31. The suction port 31 structure is easy to process. However, there is slight airflow impact at the transition side 314 of the above structure, but this arrangement manner is already a preferred solution considering processing problems and airflow impact problems.

Figure 18:
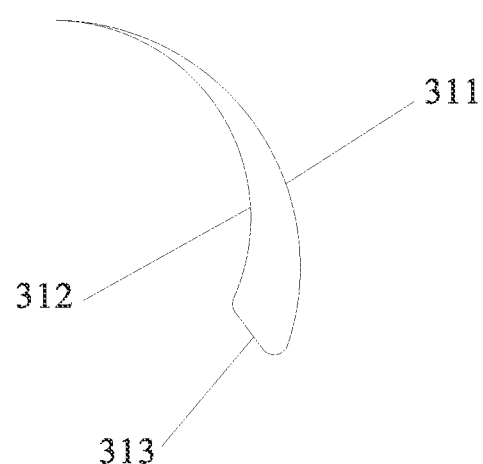
FIG. 18 shows a shape schematic diagram of the air suction port in FIG. 17.
Figure 19:
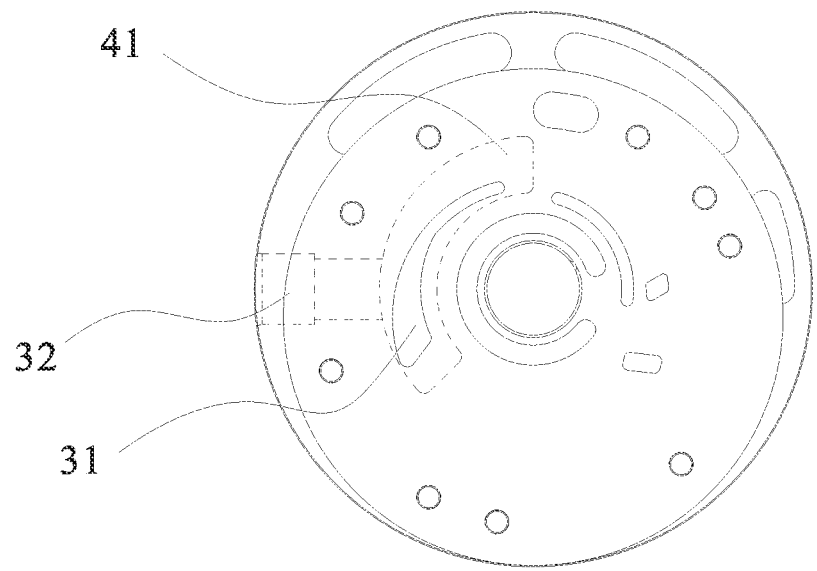
FIG. 19 shows a schematic diagram of a matching structure of an upper flange and a partition plate in a fifth embodiment of a compressor according to the present invention.
Figure 20:
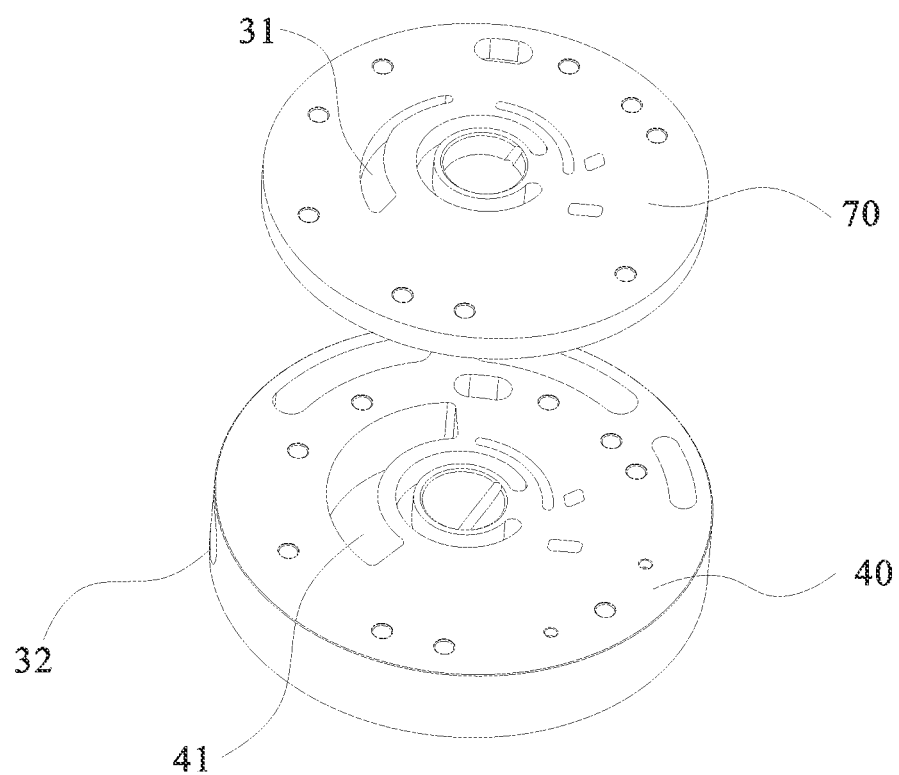
FIG. 20 shows a schematic diagram of a decomposed structure of the upper flange and the partition plate of the compressor in FIG. 19.
Figure 21:
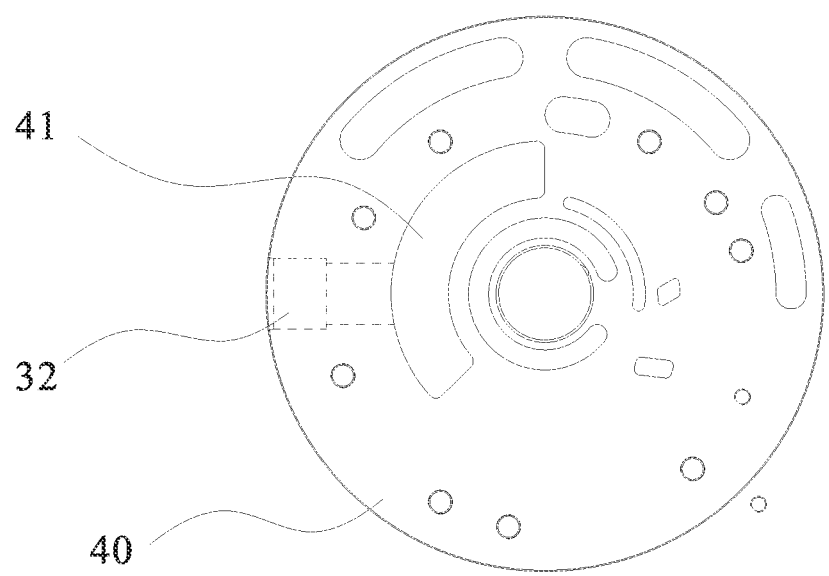
FIG. 21 shows a structural schematic diagram of the upper flange of the compressor in FIG. 19.
Figure 22:
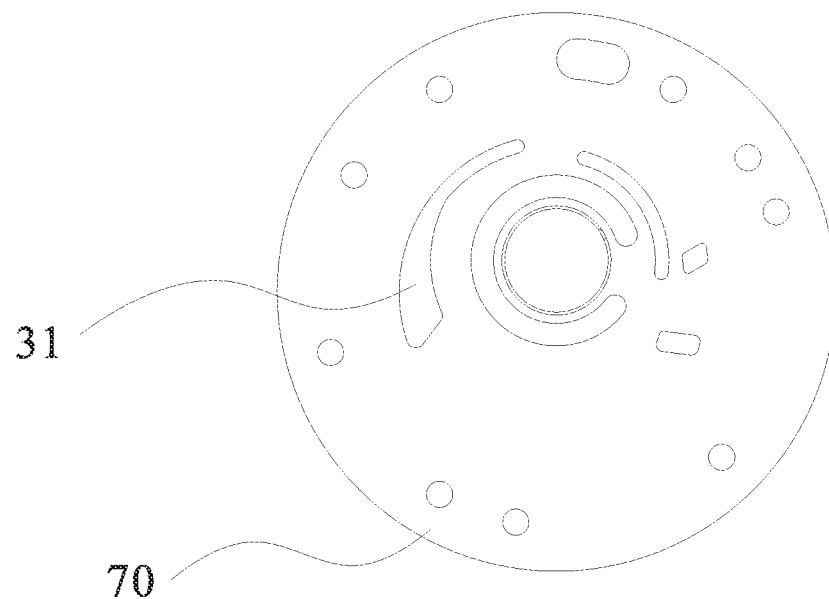
FIG. 22 shows a structural schematic diagram of the partition plate of the compressor in FIG. 19.

As shown in FIG. 17 and FIG. 18, in a fourth embodiment of the present invention, an optimum form of the air suction port is shown, and when the air suction port matches with the cylinder, the position of the air suction port is shown by a shaded portion in FIG. 17. This method can completely solve the problem of airflow impact, but since the second end of the outer side 311 and the second end of the inner side 312 are directly connected to form a narrow slit, the processing difficulty is greatly increased.

In the first embodiment, the cylinder 20 includes a bearing outer ring 21 and a bearing inner ring 22 arranged in the bearing outer ring 21, and when the basic-volume of the cylinder is the maximum, the outer side is overlapped with the inner wall of the bearing inner ring 22 or is located on the inner side of the inner wall of the bearing inner ring 22. The above structure makes the bearing inner ring 22 be hardly subjected to the impact force of the suction airflow, and although there is a slight frictional force, the inclination of the bearing inner ring 22 can still be effectively reduced.

Figure 5:
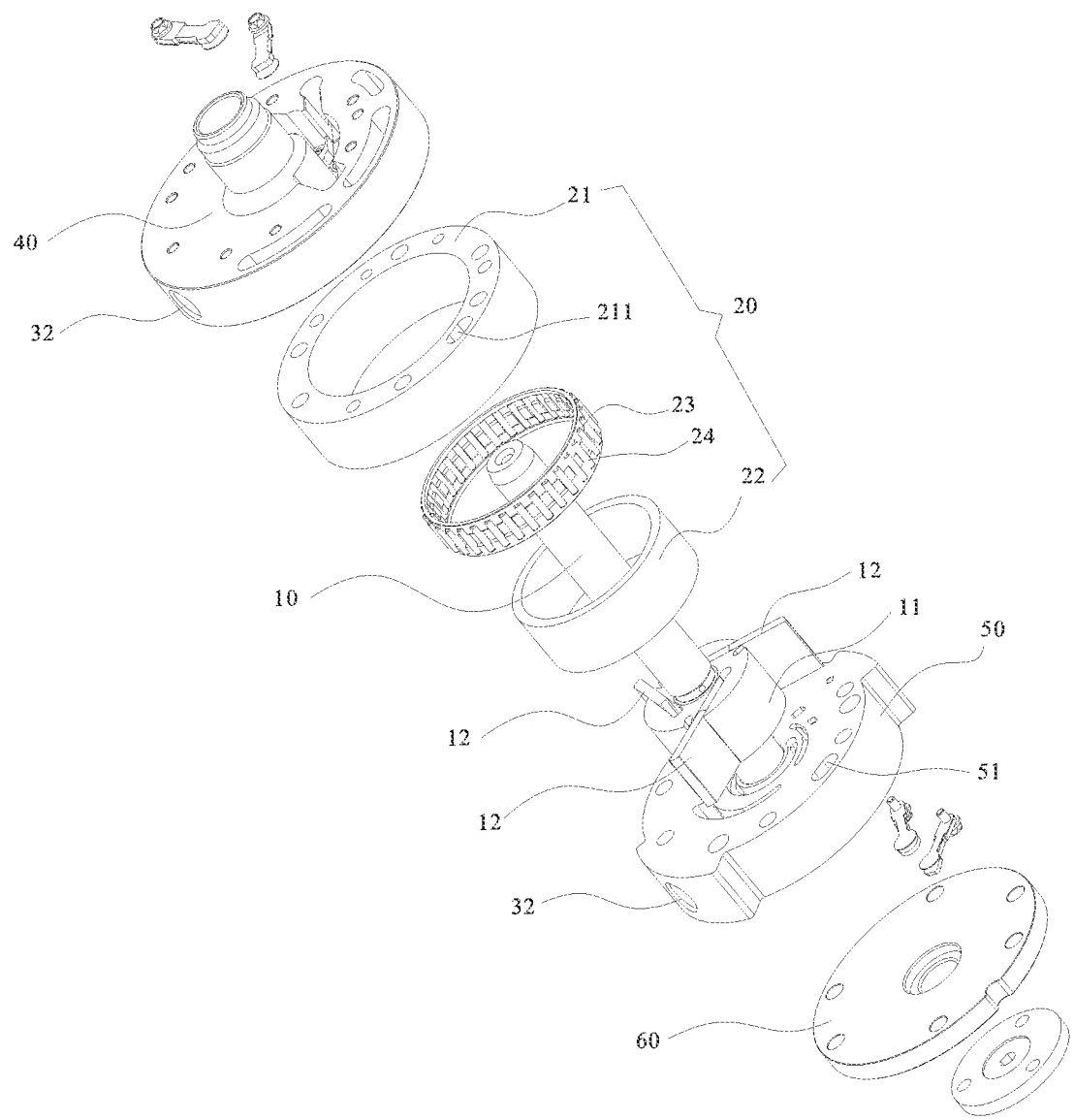
FIG. 5 shows a schematic diagram of a decomposed structure of a first embodiment of a compressor according to the present invention.
Figure 6:
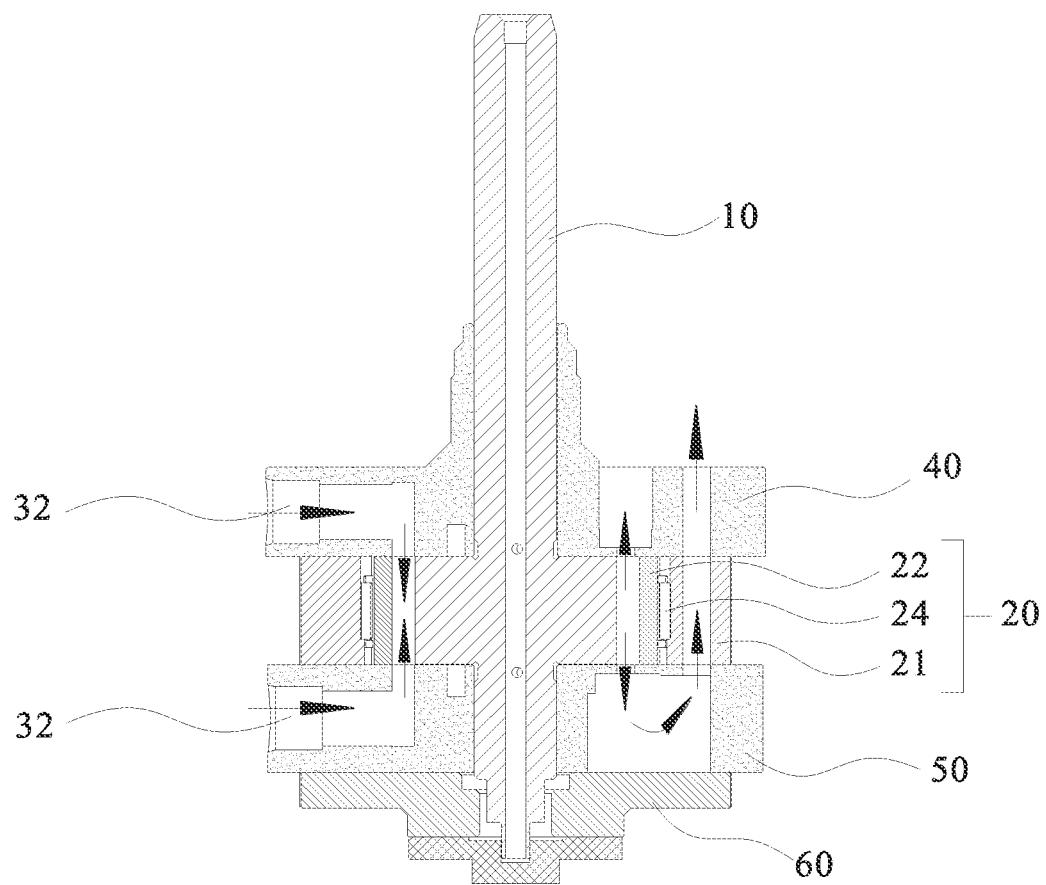
FIG. 6 shows a sectional schematic diagram of a pump body in FIG. 5.
Figure 7:
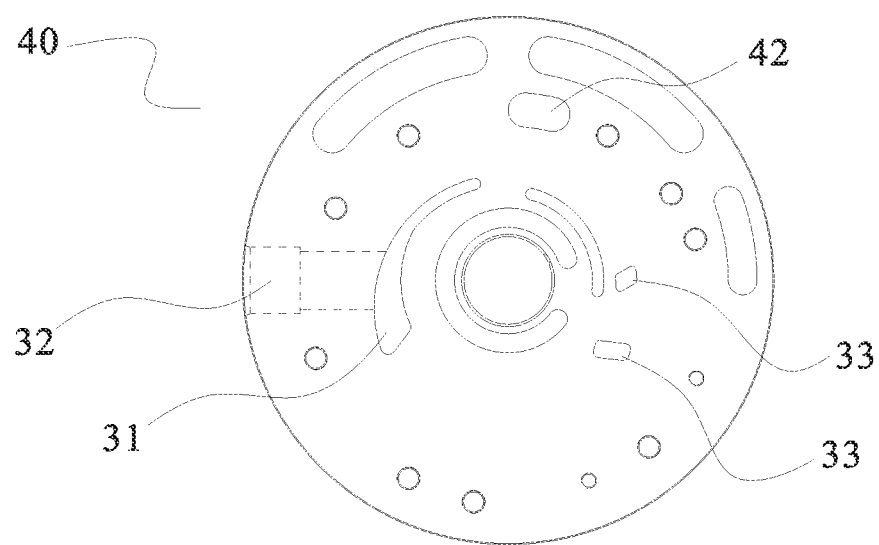
FIG. 7 shows an bottom view of an upper flange of the pump body in FIG. 5.
Figure 8:
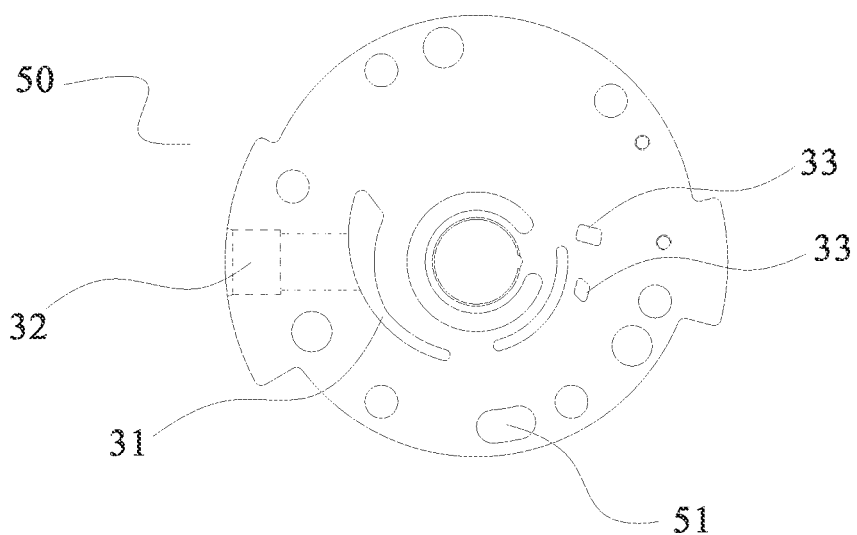
FIG. 8 shows a top view of a lower flange of the pump body in FIG. 5.

As shown in FIG. 5 and FIG. 6, the cylinder 20 further includes a holder 23 and a rolling body 24 which are arranged between the bearing outer ring 21 and the bearing inner ring 22. The cylinder is not limited to a needle bearing, and may be a ball bearing, a two-row ball bearing, a cylindrical roller bearing and the like.

Figure 11:
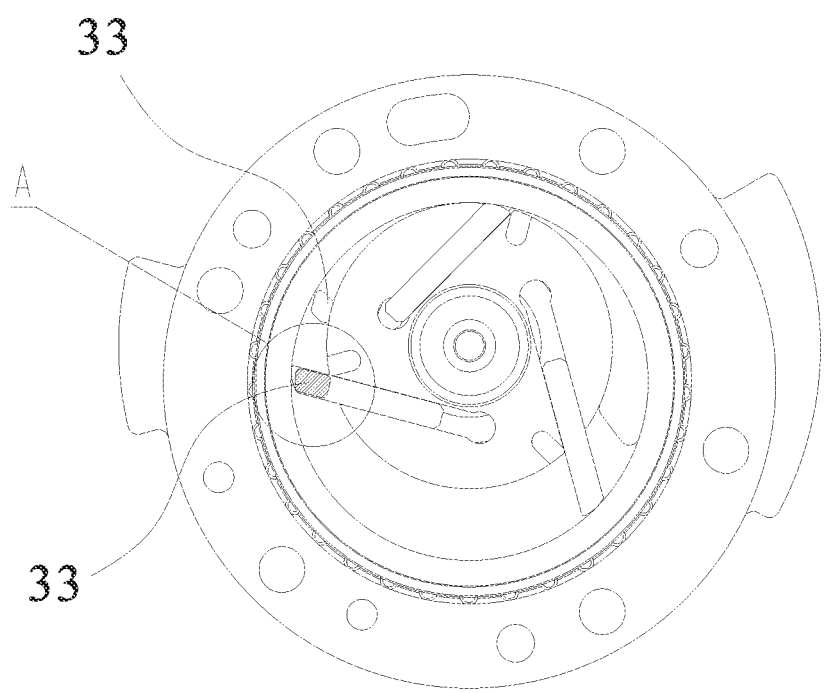
FIG. 11 shows a top view of the cylinder of the pump body in FIG. 5 in another state.
Figure 12:
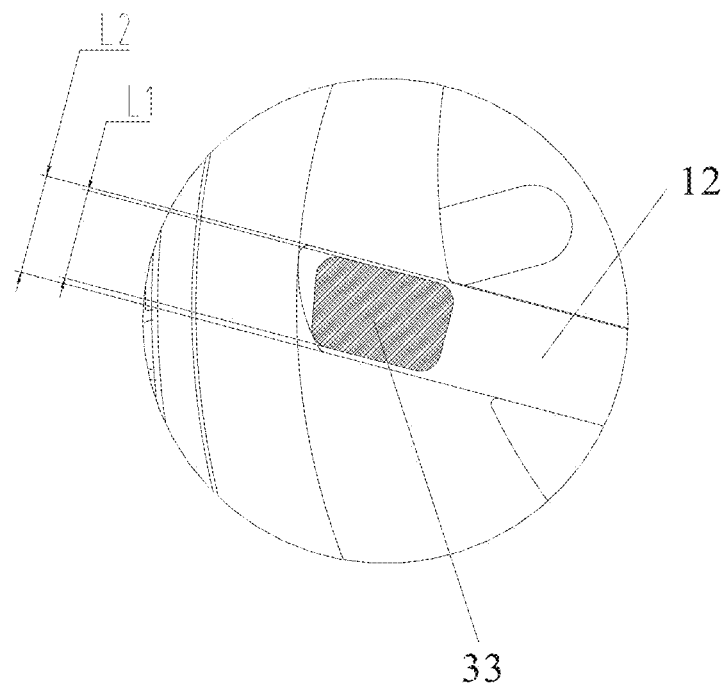
FIG. 12 shows an enlarged schematic diagram of a location A in FIG. 11.

As shown in FIG. 11 and FIG. 12, an exhaust port 33 communicating with the inner cavity is further formed on the end of the disk body facing to the cylinder 20, the exhaust port 33 is configured to be completely covered by the slip sheet 12. The compressor mainly exhausts through the exhaust port, and the exhaust port 33 is arranged in such a manner as to prevent the slip sheet 12 from causing direct blow-by between the front and back cavities while passing by the exhaust port 33, thus resulting in leakage or repeated compression (the pressures in the front and back cavities are different). The above blow-by can cause low cooling capacity or an increase in the power consumption, resulting in a decrease in the energy efficiency of the compressor.

In some embodiments, as shown in FIG. 12, the relationship between the width L1 of the exhaust port 33 and the thickness L2 of the slip sheet 12 satisfies the following relationship: L1≤L2. In the present embodiment, the exhaust port is rhombic, so that the exhaust area can be ensured to be large. The exhaust port 33 is not limited to a rhombic structure, and may be rectangular, square or circular. In order to ensure the largest exhaust port, at a certain angle, the exhaust port can be designed according to the principle that the "the slip sheet can completely cover the exhaust port", and in some embodiments, two sides of the exhaust port are designed in parallel along an extension radial direction of the slip sheet 12, and the other two sides can be designed according to the needs. When the required exhaust is less, the exhaust port can also be designed as a circular exhaust port whose diameter is not greater than the thickness L2 of the slip sheet.

The number of exhaust ports is designed according to the exhaust speed requirement of the compressor, and is not limited to four in the first embodiment, the positions of the exhaust port can be separately designed on the upper flange, the lower flange or the upper and lower flanges at the same time. In some embodiments, a plurality of exhaust ports 33 are arranged at intervals.

The air suction and exhaust process of the pump body of the compressor of the first embodiment is as follows:

The sucked air of the compressor enters the pump body through the radial air suction ports 32 of the upper and lower flanges, and then enters the compression chamber through the air suction ports 31 on the ends of the upper and lower flange ends, the compressed air is discharged through the exhaust ports 33 of the upper flange and the lower flange, the air discharged from the upper flange 40 directly enters a shell (not shown), and the air discharged from the lower flange 50 enters a cavity formed by the lower flange 50 and a lower cover plate 60 at first, and then enters the shell through a circulation hole 51 of the lower flange, a bearing outer ring circulation hole 211 and a circulation hole 42 of the upper flange.

Figure 13:
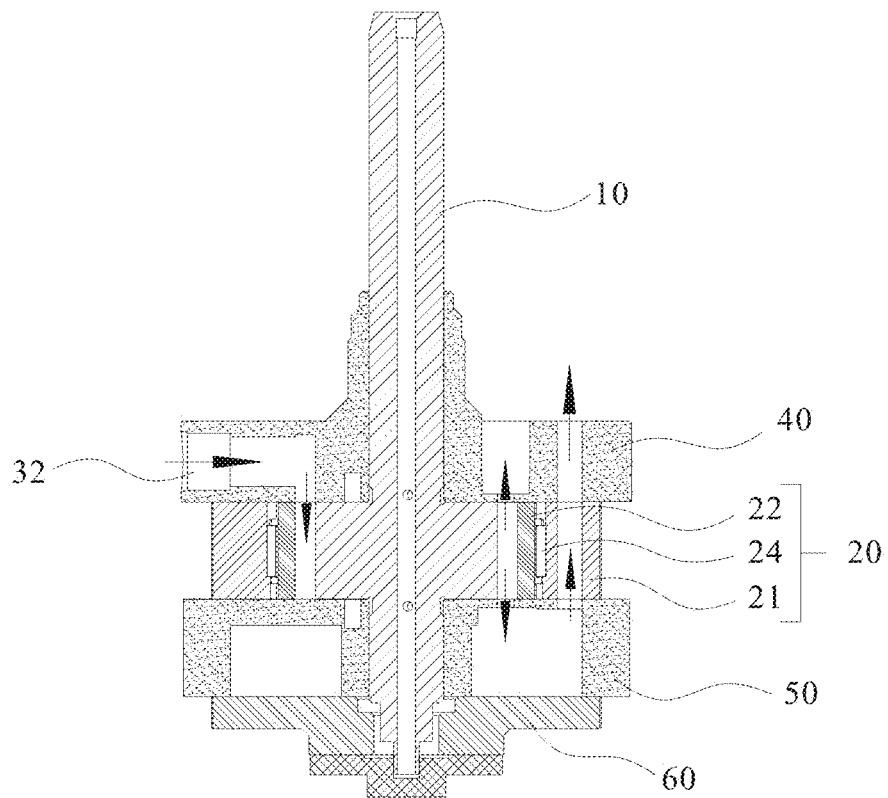
FIG. 13 shows a sectional schematic diagram of a pump body of a second embodiment of a compressor according to the present invention.
Figures 13, 14:
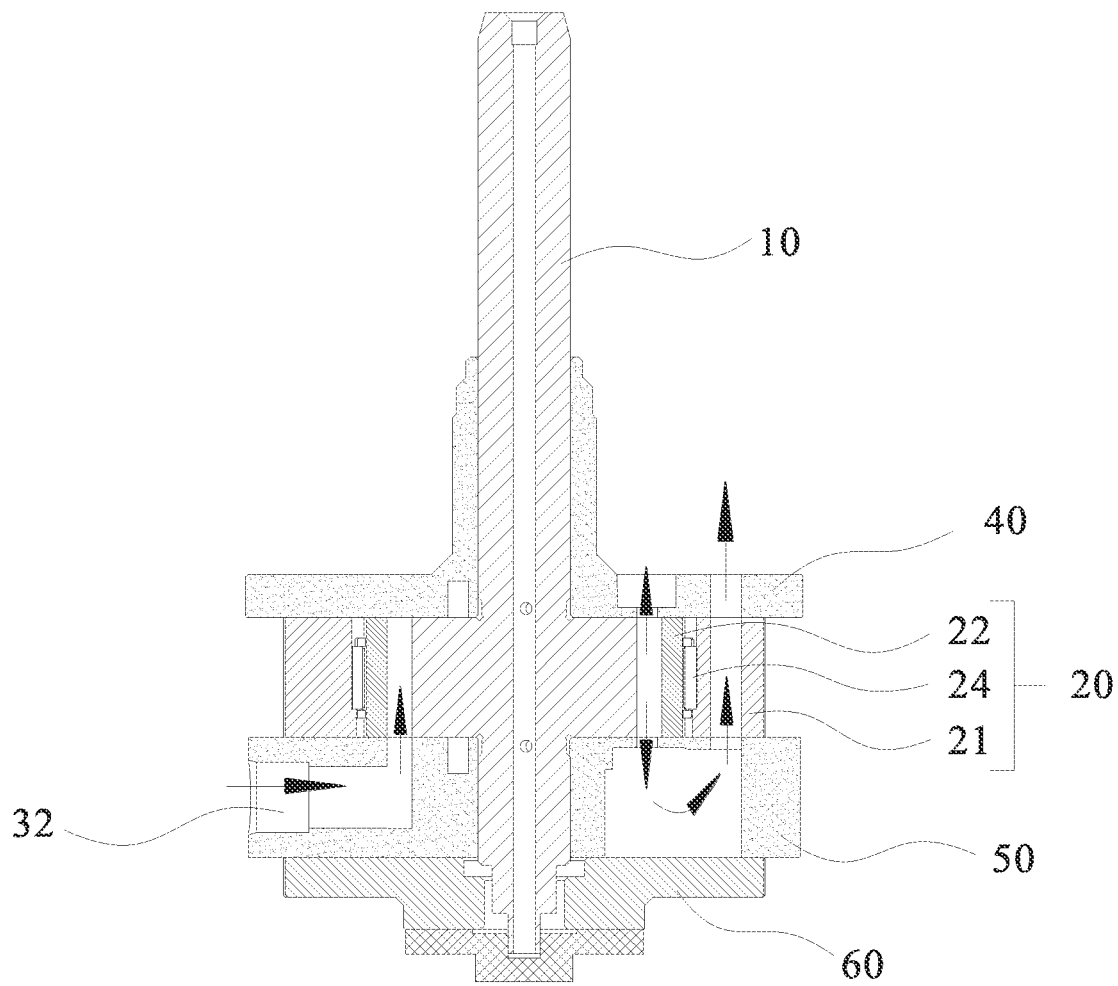
FIG. 14 shows a sectional schematic diagram of a pump body of a third embodiment of a compressor according to the present invention.

FIG. 13 shows a sectional schematic diagram of a pump body of a second embodiment of a compressor according to the present invention, and FIG. 14 shows a sectional schematic diagram of a pump body of a third embodiment of a compressor according to the present invention. In the second embodiment shown in FIG. 13, the upper flange 40 separately inhales. In the third embodiment shown in FIG. 14, the lower flange 50 separately inhales.

Figure 15A:
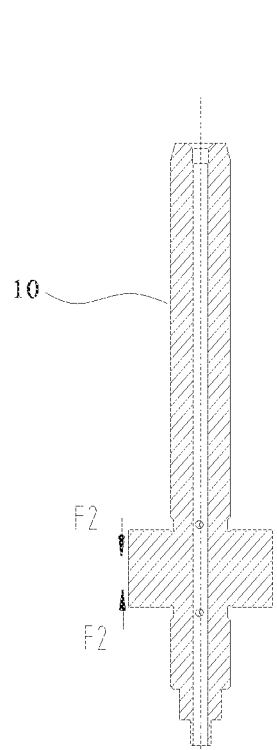
FIG. 15a to FIG. 15c respectively show force schematic diagrams of the main shaft of the compressor in the first to third embodiments.
Figure 15B:
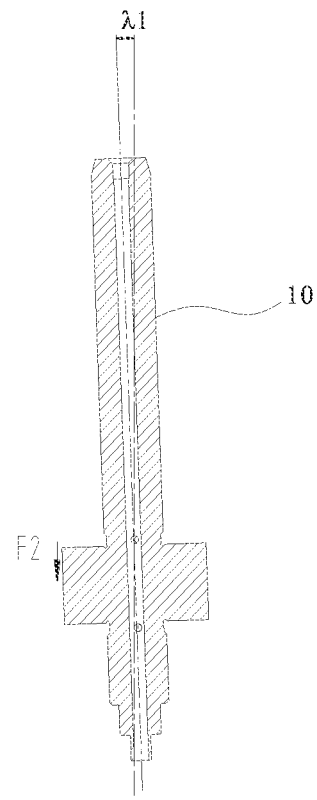
Figure 15C:
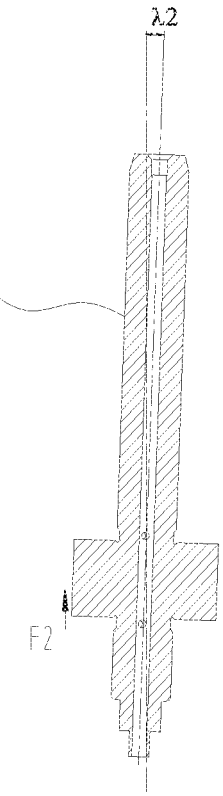

FIG. 15a to FIG. 15c respectively show force schematic diagrams of the main shaft of the compressor in the first to third embodiments. As shown in FIG. 15a, in the embodiment in which the upper and lower flanges simultaneously inhale is adopted, and the convex portion 11 is only subjected to slight airflow impact at the transition side 314 and is not subjected to the impact force of the suction airflow at other positions. The airflow generates a frictional force F2 when entering the compression chamber along the wall surface, and the outer wall surface of the convex portion 11 is simultaneously subjected to the upward and downward air frictional forces F2, which can be symmetrically offset. FIG. 15b shows the force condition of the main shaft when the upper flange separately inhales, in the present embodiment, the outer wall surface of the convex portion 11 is only subjected to the downward air frictional force F2, which is much smaller than F1 in the related technologies in FIG. 3b, therefore the deflection angle λ1 is much less than the deflection angle γ1 generated by the main shaft in FIG. 3b. Similarly, FIG. 15c shows the force condition of the main shaft when the lower flange separately inhales, in the present embodiment, the outer wall surface of the convex portion 11 is only subjected to the upward air frictional force F2, which is much smaller than F1 in the related technologies in FIG. 3c, therefore the deflection angle λ2 is much less than the deflection angle γ2 generated by the main shaft in FIG. 3b.

Figure 16A:
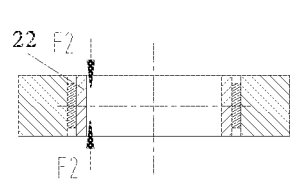
FIG. 16a to FIG. 16c respectively show force schematic diagrams of the bearing inner ring of the compressor in the first to third embodiments.
Figure 16B:
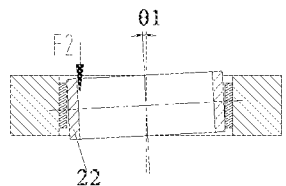
Figure 16C:
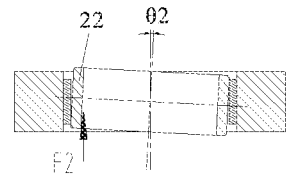

FIG. 16a to FIG. 16c respectively show force schematic diagrams of the bearing inner ring of the compressor in the first to third embodiments. As shown in FIG. 16a, in the embodiment in which the upper and lower flanges simultaneously inhale is adopted, and the bearing inner ring 22 is only subjected to slight airflow impact at the transition side 314 and is not subjected to the impact force of the suction airflow at other positions. The airflow generates a frictional force F2 when entering the compression chamber along the wall surface, and the inner wall surface of the bearing inner ring 22 is simultaneously subjected to the upward and downward air frictional forces F2, which can be symmetrically offset. FIG. 16b shows the force condition of the main shaft when the upper flange separately inhales, in the present embodiment, the inner wall surface of the bearing inner ring 22 is only subjected to the downward air frictional force F2, which is much smaller than F1 in the related technologies in FIG. 4b, therefore the deflection angle θ1 is much less than the deflection angle β1 generated by the main shaft in FIG. 4b. Similarly, FIG. 16c shows the force condition of the main shaft when the lower flange separately inhales, in the present embodiment, the bearing inner ring 22 is only subjected to the upward air frictional force F2, which is much smaller than F1 in the related technologies in FIG. 4c, therefore the deflection angle θ2 is much less than the deflection angle β2 generated by the main shaft in FIG. 3b.

In addition, in the related technologies, the structure of the air suction port also has a frictional force, but since it is much smaller than the direct impact force of the airflow, it is not shown in FIG. 3a to FIG. 3c and FIG. 4a to FIG. 4c.

In the present invention, the air suction port is not limited to be arranged on the flange, if there are other parts, radial air suction ports or air suction ports in other directions can also be formed in the other parts, and then the air is introduced into the air suction port and then into the compression chamber by disposing a channel. For example, in the fifth embodiment, the air suction port is arranged on the partition plate, which will be described in detail below.

FIG. 19 to FIG. 22 show structural schematic diagram of the fifth embodiment according to the present invention. In the fifth embodiment, the compressor includes an upper flange 40, a lower flange 50 and a partition plate 70 between the upper flange 40 and the lower flange 50, the cylinder 20 is located between the upper flange 40 and the lower flange 50, and the partition plate forms an air inlet and outlet device. The partition plate 70 is located between the upper flange 40 and the cylinder 20, an overflow channel communicating the air suction port 31 with the outside is further arranged on the upper flange 40, the overflow channel includes an overflow port 41 formed on an end of the upper flange 40 facing to the partition plate, and the air suction port 31 is located within the range of the overflow port 41. In the fifth embodiment, the upper flange 40 and the partition plate 70 match to achieve air intake of the compressor. The process of processing the air suction port 31 on the partition plate 70 is simple (it is much less than the processing depth of the flange, and the position with a small cross-sectional area has great influence on a cutter when the air suction port is processed on the end of the flange in the first to fourth embodiments).

In some embodiments not shown in the figures, the partition plate is located between the lower flange and the cylinder, an overflow channel communicating the air suction port 31 with the outside is arranged on the lower flange, the overflow channel includes an overflow port formed in an end of the lower flange facing to the partition plate, and the air suction port is located within the range of the overflow port. The working process and the principle of the embodiment are basically the same as those in the fifth embodiment, and thus details are not described herein again.

In other embodiments not shown in the figures, a plurality of cylinders are disposed, and the partition plate is arranged between two adjacent cylinders. The air suction port and the radial suction port formed in the partition plate can also achieve the air intake of the compressor.

The present invention further provides an air conditioner, including a compressor, and the compressor is the compressor described above. Since the compressor described above is provided, the inclination of the main shaft can be effectively reduced.

From the above description, it can be seen that the above-described embodiments of the present invention achieve the following technical effects:

The outer side of the air suction port does not exceed the inner wall of the cylinder; the inner side does not exceed the outer wall of the convex portion, and the connecting side does not exceed the side wall of the slip sheet closest to the air suction port. Therefore, whether the upper flange separately inhales, the lower flange separately inhales, or the upper and lower flanges simultaneously inhale, the convex portion is hardly subjected to the impact force of the suction airflow. Only when the airflow enters the compression chamber along the wall surface, the frictional force is formed on the wall surface, and the frictional force is much smaller than the impact force of the air suction port in the related technologies, so that the inclination of the main shaft can be effectively reduced. For the structure using the bearing outer ring and the bearing inner ring, the bearing inner ring is hardly subjected to the impact force of the suction airflow, and only the frictional force exists, thereby effectively reducing the inclination of the bearing inner ring.

In the description of the present invention, it should be understood that orientation or position relationships indicated by orientation words such as "front, back, upper, lower, left, right", "transverse, vertical, perpendicular horizontal" and "top, bottom" and the like are generally orientation or position relationships shown on the basis of the drawings, and are merely for the convenience of describing the present invention and simplifying the description, in the absence of opposite statement, these orientation words do not indicate or imply that the referred devices or elements must have specific orientations or must be constructed and operated in specific orientations, and thus cannot be construed as limiting the protection scope of the present invention; and the orientation words "inside and outside" refer to the inside and outside of the contours of the components themselves.

For the convenience of description, spatial relative terms such as "on", "above", "on the upper surface", "over" and the like are used herein for describing the spatial position relationship between one device or feature with other devices or features shown in the figures. It should be understood that the spatial relative terms are intended to encompass different orientations in use or operation in addition to the orientations of the device described in the figures. For example, if the device is inverted, the device is described as "above other devices or configurations" or the device "above other devices or configurations" is positioned "below other devices or configurations" or "under other devices or configurations". Thus, the exemplary term "above" can include two orientations, that is, "above" and "below". The device can also be positioned in other different ways (rotated 90 degrees or in other orientations), and the spatial relative description used here is interpreted accordingly.

In addition, it should be noted that the words "first", "second" and the like are used to limit parts and components and are only for the convenience of distinguishing the corresponding parts components; if not stated otherwise, the above words have no special meaning and cannot be construed as limitations to the protection scope of the present invention.

The above descriptions are only preferred embodiments of the present invention, and are not intended to limit the present invention, and various modifications and changes can be made to the present invention for those skilled in the art. Any modifications, equivalent substitutions, improvements and the like made within the spirit and scope of the present invention shall all fall within the protection scope of the present invention.

The invention claimed is:

1. A compressor, comprising:
a main shaft provided with a convex portion, and a slip sheet installed on the convex portion;
a cylinder, wherein the convex portion and the slip sheet are penetrated in an inner cavity of the cylinder; and
an upper flange and a lower flange, the cylinder is located between the upper flange and the lower flange, and at least one of the upper flange and the lower flange forms the air inlet and outlet device, the air inlet and outlet device sleeved on the main shaft, and the air inlet and outlet device comprises a disk body, an air suction port communicating with the inner cavity is formed on an end of the disk body facing to the cylinder, the air suction port comprises an outer side, an inner side, a connecting side and a transition side, wherein the connecting side is connected between a first end of the outer side and a first end of the inner side, the transition side is connected between a second end of the outer side and a second end of the inner side, and the inner side comprises a first arc-shaped segment, a turning point, and a second arc-shaped segment, the first arc-shaped segment is connected with the transition side, the second arc-shaped segment is connected with the connecting side, the first arc-shaped segment and the second arc-shaped segment have different arc curvatures that are joined together at the turning point, and the first arc-shaped segment and the outer side form a suction section with a constant width in a circumferential direction of the suction port;
wherein the outer side is overlapped with an inner wall of the cylinder or is located on an inner side of the inner wall of the cylinder, the inner side is overlapped with an outer wall of the convex portion or is located on an outer side of the convex portion, and when the basic-volume of the cylinder is the maximum, the connecting side is overlapped with a side wall of the slip sheet or is located on an inner side of the side wall of the slip sheet, and the side wall of the slip sheet is closest to the air suction port and facing to a rotating direction of the main shaft.

2. The compressor according to claim 1, wherein a radial air suction port communicating with the air suction port is further formed in the disk body.

3. The compressor according to claim 1, wherein the cylinder comprises a bearing outer ring and a bearing inner ring arranged in the bearing outer ring, the outer side is overlapped with the inner wall of the bearing inner ring or is located on the inner side of the inner wall of the bearing inner ring.

4. The compressor according to claim 3, wherein the cylinder further comprises a holder and a rolling body which are arranged between the bearing outer ring and the bearing inner ring.

5. The compressor according to claim 1, wherein an exhaust port communicating with the inner cavity is formed on the end of the disk body facing to the cylinder, and the exhaust port is configured to be completely covered by the slip sheet.

6. The compressor according to claim 5, wherein the width L1 of the exhaust port and the thickness L2 of the slip sheet satisfies the following relationship:

$$L1 \leq L2.$$

7. The compressor according to claim 5, wherein the exhaust port is one of a plurality of exhaust ports, the exhaust port being spaced apart from another exhaust port of the plurality of exhaust ports.

8. An air conditioner, comprising a compressor, wherein the compressor is the compressor according to claim 1.

* * * * *